(12) United States Patent  
Wilson, Sr.

(10) Patent No.: US 7,542,284 B1  
(45) Date of Patent: Jun. 2, 2009

(54) LAPTOP COMPUTER WITH ATTACHED PRINTER

(76) Inventor: Richard M. Wilson, Sr., 3204 Calydon Ct., Fort Washington, MD (US) 20744

( * ) Notice: Subject to any disclaimer, the term of this patent is extended or adjusted under 35 U.S.C. 154(b) by 313 days.

(21) Appl. No.: 11/601,870

(22) Filed: Nov. 20, 2006

(51) Int. Cl.  
*G06F 1/00* (2006.01)

(52) U.S. Cl. .................. 361/686; 206/320; 400/472; 235/381

(58) Field of Classification Search .......... 206/576, 206/320, 304; 705/27; 400/472; 235/381; 361/679–687, 724–727  
See application file for complete search history.

(56) References Cited

U.S. PATENT DOCUMENTS

| | | | |
|---|---|---|---|
| 4,839,837 A | 6/1989 | Chang | |
| 5,364,196 A | 11/1994 | Baitz et al. | |
| 5,647,484 A * | 7/1997 | Fleming | 206/576 |
| 6,362,954 B1 * | 3/2002 | LeVander | 361/683 |
| 6,597,568 B2 | 7/2003 | Ryder | |
| 2003/0043109 A1 | 3/2003 | Hong | |
| 2005/0137942 A1 * | 6/2005 | LaFleur | 705/27 |

* cited by examiner

*Primary Examiner*—Hung V Duong  
(74) *Attorney, Agent, or Firm*—Crossley Patent Law; Mark A. Crossley

(57) ABSTRACT

A laptop computer with an attached printer unit. The printer unit is a detachable unit that normally is attached to the base of the laptop computer and includes an input slot, an output slot, a USB connection port, a power cord selection slot, and a pair of slots for ink cartridges. The input slot allows for a single piece of paper to be inserted into the printer unit, while the output slot emits the paper after it has been printed on by the printer unit. The top surface of the printer unit has a plurality of mounting holes, while the bottom of the laptop has a plurality of mounts, allowing the printer unit to be securely attached to the laptop, yet at the same time, allowing it to be easily detachable. An included USB connection port allows the printer to be electronically connectable to the laptop unit.

9 Claims, 3 Drawing Sheets

LAPTOP COMPUTER WITH ATTACHED PRINTER

BACKGROUND OF THE INVENTION

The present invention concerns that of a new and improved laptop computer with an attached printer. The printer is a detachable unit that normally is attached to the base of the laptop computer and includes an input slot, an output slot, a USB connection port, a power cord selection slot, and a pair of slots for ink cartridges.

DESCRIPTION OF THE PRIOR ART

U.S. Pat. No. 5,364,196, issued to Baitz et al., discloses a laptop computer with a base housing, an associated printer, an input keyboard, and a screen.

U.S. Pat. No. 4,839,837, issued to Chang, discloses a portable, three-layered laptop computer assembly that includes a keyboard member pivotally attached to an output member and provided with an intermediate display member.

U.S. Pat. No. 5,847,484, issued to Fleming, discloses an encasement device for a portable computer and other associated peripheral devices.

U.S. Pat. No. 6,597,568, issued to Ryder, discloses a briefcase or carrying case for a mobile office that holds a number of interconnected electronic devices, including a computer and a printer.

U.S. Application No. 2003/0043109, filed by Hong, discloses a single unit compact, self-contained, portable personal computer system that includes a printing module.

SUMMARY OF THE INVENTION

The present invention concerns that of a new and improved laptop computer with an attached printer unit. The printer unit is a detachable unit that normally is attached to the base of the laptop computer and includes an input slot, an output slot, a USB connection port, a power cord selection slot, and a pair of slots for ink cartridges. The input slot allows for a single piece of paper to be inserted into the printer unit, while the output slot emits the paper after it has been printed on by the printer unit. The top surface of the printer unit has a plurality of mounting holes, while the bottom of the laptop has a plurality of mounts, allowing the printer unit to be securely attached to the laptop, yet at the same time, allowing it to be easily detachable. An included USB connection port allows the printer to be electronically connectable to the laptop unit.

There has thus been outlined, rather broadly, the more important features of a laptop computer with an attached printer unit that the detailed description thereof that follows may be better understood and in order that the present contribution to the art may be better appreciated. There are, of course, additional features of the laptop computer with an attached printer unit that will be described hereinafter and which will form the subject matter of the claims appended hereto.

In this respect, before explaining at least one embodiment of the laptop computer with an attached printer unit in detail, it is to be understood that the laptop computer with an attached printer unit is not limited in its application to the details of construction and to the arrangements of the components set forth in the following description or illustrated in the drawings. The laptop computer with an attached printer unit is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present laptop computer with an attached printer unit. It is important, therefore, that the claims be regarded as including such equivalent constructions insofar as they do not depart from the spirit and scope of the present invention.

It is therefore an object of the present invention to provide a laptop computer with an attached printer unit which has all of the advantages of the prior art and none of the disadvantages.

It is another object of the present invention to provide a laptop computer with an attached printer unit which may be easily and efficiently manufactured and marketed.

It is another object of the present invention to provide a laptop computer with an attached printer unit which is of durable and reliable construction.

It is yet another object of the present invention to provide a laptop computer with an attached printer unit which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
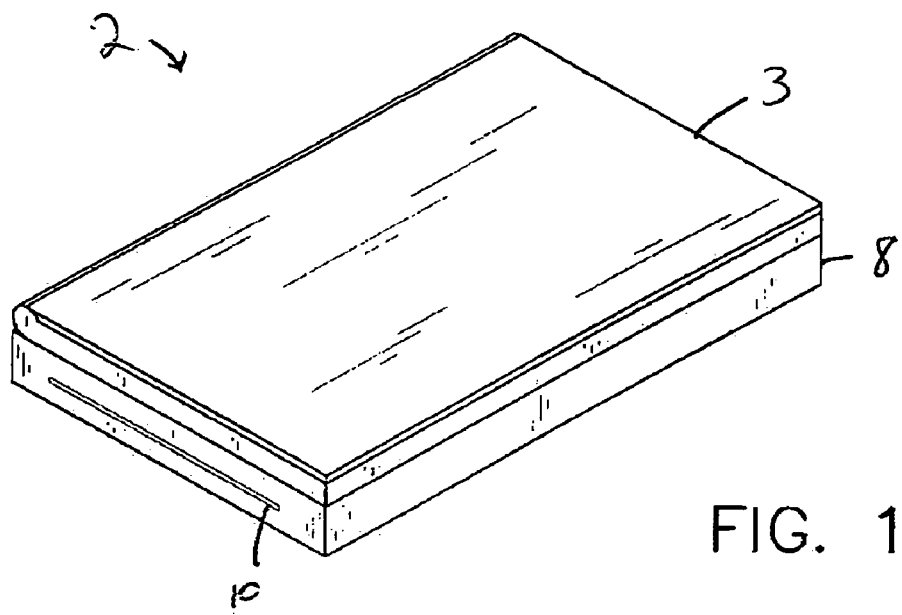
FIG. 1 shows a rear perspective view of the laptop computer with an attached printer unit.
Figure 2:
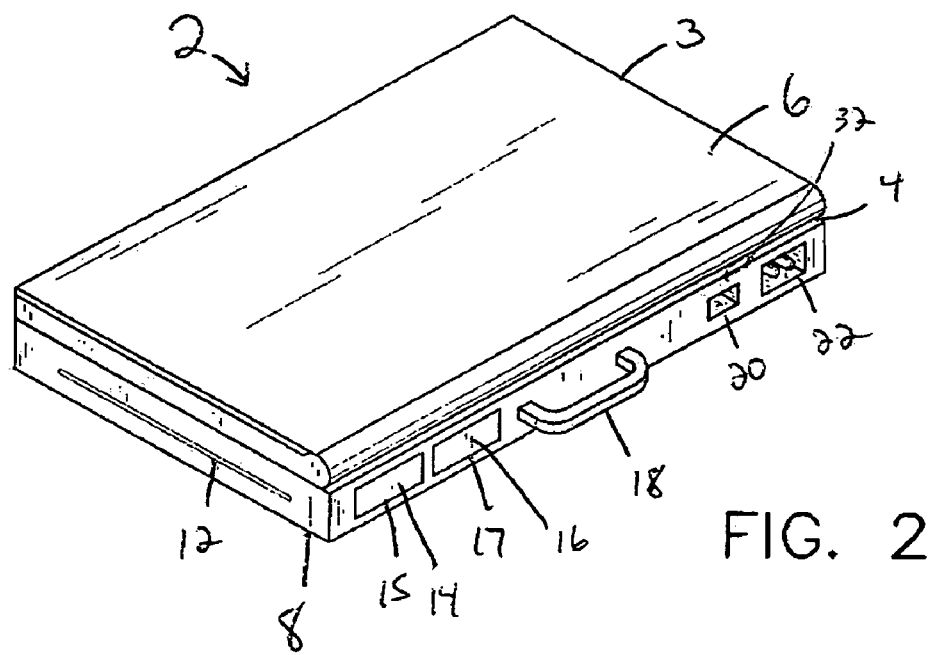
FIG. 2 shows a front perspective view of the laptop computer with an attached printer unit.
Figure 3:
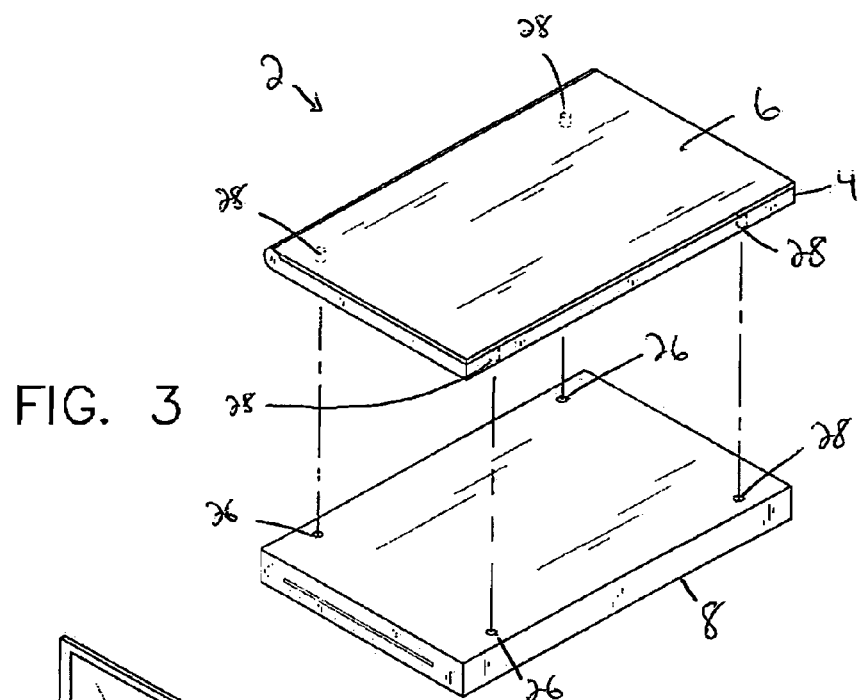
FIG. 3 shows a rear perspective view of the laptop computer with an attached printer unit, highlighting the mounting holes on the printer unit and the mounts on the laptop computer.
Figure 4:
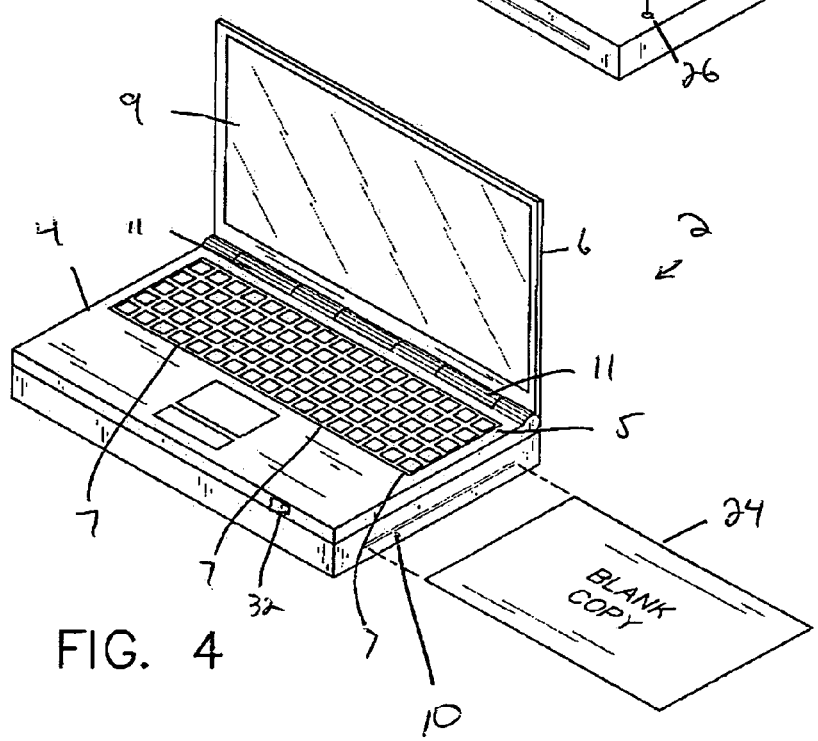
FIG. 4 shows a right front perspective view of the laptop computer as it would appear opened and with a piece of paper being inserted into the input slot of the attached printer unit.
Figure 5:
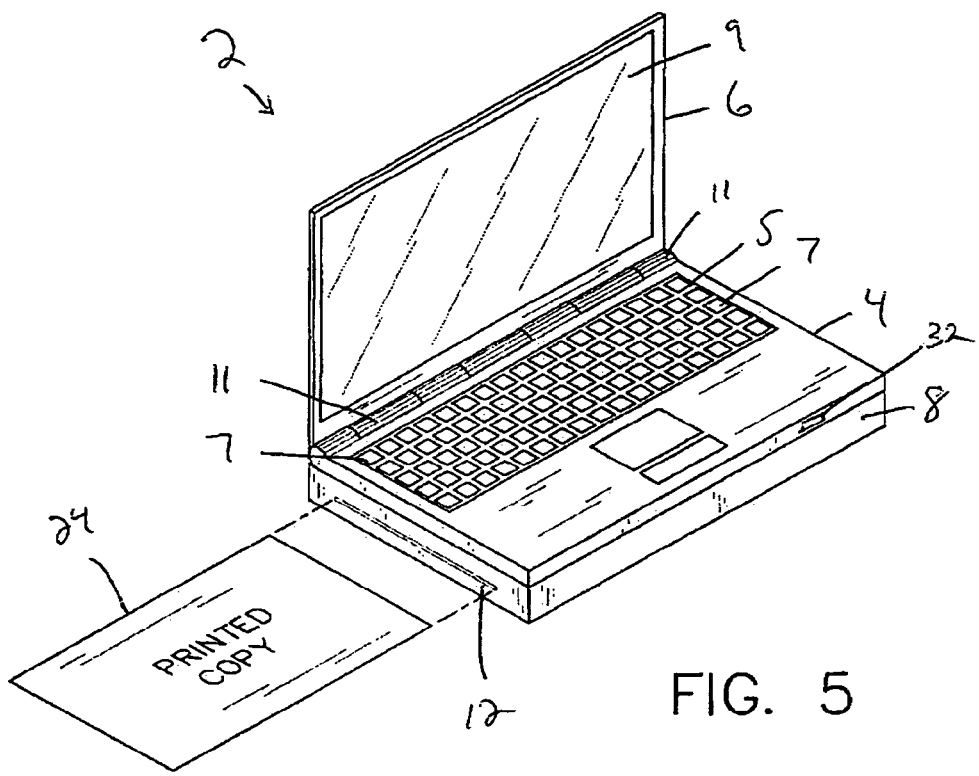
FIG. 5 shows a left front perspective view of the laptop computer as it would appear opened and with a piece of paper being emitted from the output slot of the attached printer unit.
Figure 6:
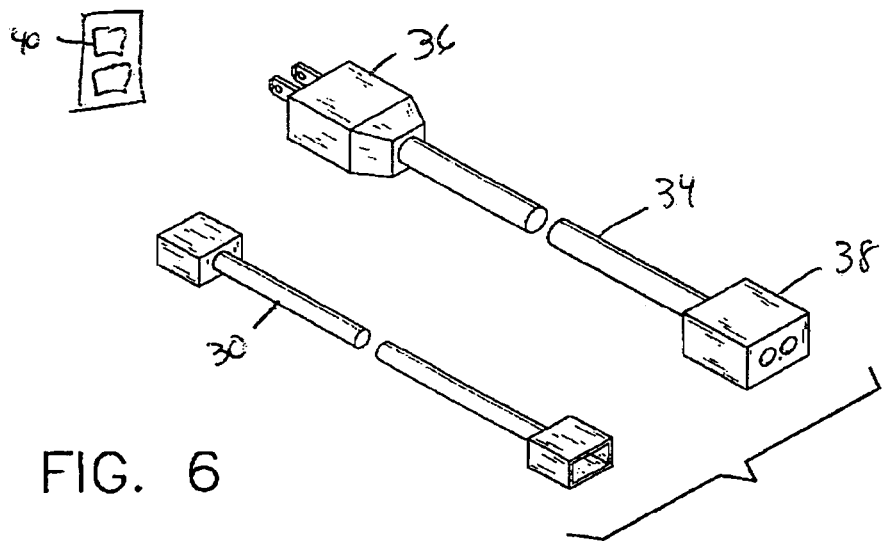
FIG. 6 shows a perspective view of a USB cable and a power cable that is used with the laptop computer and the attached printer unit.

With reference now to the drawings, and in particular to FIGS. 1 through 6 thereof, a new laptop computer and the attached printer unit embodying the principles and concepts of the present invention and generally designated by the reference numeral 2 will be described.

As best illustrated in FIGS. 1 through 6, the laptop computer and the attached printer unit 2 comprises a laptop computer 3, with the laptop computer 3 comprising a bottom module 4 and a top module 6 that are pivotally attached to one another through a plurality of hinges 11. The bottom module 4 has two surfaces comprising a top surface and a bottom surface, and furthermore, includes four edges comprising a front edge, a rear edge, a left edge and a right edge. Furthermore, the top module 6 has two surfaces comprising a top surface and a bottom surface, and furthermore, includes four edges comprising a front edge, a rear edge, a left edge and a right edge. Both the bottom module 4 and the top module 6 have rectangular shapes and each of them have a length and a width.

The top surface of the bottom module 4 has a keyboard 5 that includes a plurality of keys 7. Furthermore, the bottom surface of the top module 6 further includes a screen 9 where visual output from the keyboard 5 and the plurality of keys 7 can be observed.

The laptop computer and the attached printer unit 2 also include a printer unit 8 that has two surfaces comprising a top surface and a bottom surface, and furthermore, comprises two edges comprising a left edge and a right edge. The printer unit 8 further comprises two edges comprising a front edge and a rear edge. The printer unit 8 has a rectangular shape that has both a length and a width, with the length and the width of the printer unit 8 being the same as the length and width of the bottom module 4.

The top surface of the printer unit 8 includes a plurality of mounting holes 26, while the bottom surface of the bottom module 4 of the laptop computer 3 includes a plurality of mounts 28 that can be inserted into the mounting holes 26. This connectivity system allows the two separate units to be both easily attachable to one another, while at the same time, easily removably from one another.

The printer unit 8 includes a printer input slot 10 that is located on the right edge of the printer unit 8 and also includes a printer output slot 12 that is located on the left edge of the printer unit 8. These slots essentially allow a single piece of paper 24 at a time to be inserted into the printer unit 8, get printed on by the printer unit 8, and the emitted through the printer output slot 12.

The printer unit 8 further includes a handle 18 which is located on the front edge of the printer unit 8. The handle provides for easily portability of the printer unit 8, both when it is separated from the laptop computer 3 and when it is connected to it. The front edge of the printer unit 8 further comprises a USB connection 20 and a power cord connection 22, with the USB connection 20 allowing the printer unit 8 to connect to the laptop computer 3 through a USB cable 30 and a terminal 32 located on the laptop computer 3. The power cord connection 22 allows the printer unit 8 to be connected up to an independent power source through a power cable 34. The power cable 34 would include a wall plug 36 for connecting to an outlet 40 and a connector plug 38 for connecting to the power cord connection 22, with the outlet 40 being a source of electricity.

The printer unit 8 further comprises a pair of slots 15 and 17 located on the front edge of the printer unit 8, with these slots 15 and 17 designed for insertion of ink cartridges 14 and 16, respectively. Preferably, one of the ink cartridges would be a black-and-white ink cartridge while the other ink cartridge would be a color cartridge.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A computing and printing device comprising:
   a laptop computer,
   a printer unit, and
   means for attaching the printer unit to the laptop computer,
   wherein the laptop computer further comprises:
      a bottom module having two surfaces comprising a top surface and a bottom surface, the bottom module also having four edges comprising a left edge, a right edge, a front edge, and a rear edge, the bottom module having a rectangular shape,
      a top module having two surfaces comprising a top surface and a bottom surface, the top module also having four edges comprising a left edge, a right edge, a front edge, and a rear edge, the top module having a rectangular shape,
      a keyboard located on the top surface of the bottom module, the keyboard comprising a plurality of keys,
      a screen located on the bottom surface of the top module, and
      means for connecting the top module to the bottom module,
   wherein the printer unit has two surfaces comprising a top surface and a bottom surface, the printer unit also having four edges comprising a left edge, a right edge, a front edge, and a rear edge, the printer unit also having a rectangular shape, and further wherein the printer unit has a length and a width,
   wherein the length of the printer unit is the same as the length of the bottom module, and further wherein the width of the printer unit is the same as the width of the bottom module.

2. A computing and printing device according to claim 1 wherein the means for connecting the top module to the bottom module further comprises a plurality of hinges that connect the top module to the bottom module.

3. A computing and printing device according to claim 2 wherein the means for attaching the printer unit to the laptop computer further comprises
   (a) a plurality of mounting holes located on the top surface of the printer unit, and
   (b) a plurality of mounts located on the bottom surface of the bottom module,
   (c) wherein the mounts can be attached to the mounting holes by placement of the bottom module of the laptop computer over the printer unit.

4. A computing and printing device according to claim 3 wherein the printer unit further comprises:
   (a) a printer input slot attached to the right edge of the printer unit,
   (b) a printer output slot attached to the left edge of the printer unit,
   (c) wherein paper can be inserted into the printer input slot for printing purposes, and
   (d) wherein the printer unit will emit the paper through the printer output slot after it has been printed upon.

5. A computing and printing device according to claim 4 wherein the printer unit further comprises at least one ink cartridge slot, and further comprises at least one ink cartridge, wherein each ink cartridge is inserted into an ink cartridge slot.

6. A computing and printing device according to claim 5 wherein the device further comprises (a) means for connecting the printer unit to a power source, and
(b) means for connecting the printer unit to the laptop computer.

7. A computing and printing device according to claim 6 wherein the means for connecting the printer unit to a power source further comprises:
   (a) a power cord connection located on the laptop computer,
   (b) a power cable having a wall plug and a connector plug,
   (c) a wall outlet connected to household current,
   (d) wherein the wall plug is connected to the wall outlet, and
   (e) further wherein the connector plug is connected to the power cord connection located on the laptop computer.

8. A computing and printing device according to claim 7 wherein the means for connecting the printer unit to the laptop computer further comprises:
   (a) a USB connection on the laptop computer,
   (b) a USB connection on the printer unit,
   (c) a USB cable,
   (d) wherein the USB cable is connected to both the USB connection on the laptop computer and the USB connection on the printer unit.

9. A computing and printing device according to claim 8 wherein the device further comprises a handle, the handle located on the front edge of the printer unit.

* * * * *